United States Patent [19]
Hino et al.

[11] Patent Number: 5,918,719
[45] Date of Patent: Jul. 6, 1999

[54] TIRE ROLLER FOR TRANSPORTING SLABS

[75] Inventors: Masamichi Hino, Kobe; Teruo Hamatsuka, Kyoto; Toshifumi Toyotomi, Itami; Shigeki Morie, Amagasaki; Akira Shinosaki; Yasuhiko Horibe, both of Hirakata, all of Japan

[73] Assignee: Kubota Corporation, Osaka, Japan

[21] Appl. No.: 08/845,440

[22] Filed: Apr. 25, 1997

[30] Foreign Application Priority Data

| Dec. 27, 1996 | [JP] | Japan | 8-349290 |
| Dec. 27, 1996 | [JP] | Japan | 8-349291 |
| Dec. 27, 1996 | [JP] | Japan | 8-349292 |
| Mar. 10, 1997 | [JP] | Japan | 9-054314 |

[51] Int. Cl.$^6$ ............................................. B65G 13/00
[52] U.S. Cl. ............................................. 193/37; 193/35 R
[58] Field of Search ..................... 198/780, 952; 193/35 R, 37; 492/39, 46

[56] References Cited

U.S. PATENT DOCUMENTS

| 1,923,773 | 8/1933 | Carpenter . | |
| 5,044,482 | 9/1991 | Kramer | 193/37 |
| 5,050,718 | 9/1991 | Orlosky | 193/35 R |
| 5,143,684 | 9/1992 | Stein et al. . | |

FOREIGN PATENT DOCUMENTS

| 0 005 012 | 10/1979 | European Pat. Off. . | |
| 0 327 042 | 8/1989 | European Pat. Off. . | |
| 0 444 312 A1 | 9/1991 | European Pat. Off. . | |
| 0 471 218 A1 | 2/1992 | European Pat. Off. . | |
| 1 458 321 | 11/1966 | France . | |
| 683 850 | 7/1938 | Germany . | |
| 1 024 719 | 2/1958 | Germany . | |
| 40 41 217 A1 | 7/1991 | Germany . | |
| 4-148713 | 5/1992 | Japan | 193/37 |
| 506 307 | 5/1939 | United Kingdom . | |
| 2 130 307 | 5/1984 | United Kingdom . | |

*Primary Examiner*—James R. Bidwell
*Attorney, Agent, or Firm*—Armstrong, Westerman, Hattori, McLeland & Naughton

[57] ABSTRACT

A slab transport tire roller includes a tire which is diminished in thermal stress. A tire assembly disposed at each of outer peripheral portions of a pipe for passing cooling water therethrough includes the tire adapted to contact a slab, support members connecting the tire to the pipe, and rotation preventing means engaging the tire with the support members to render the tire rotatable with the support members.

15 Claims, 8 Drawing Sheets

TIRE ROLLER FOR TRANSPORTING SLABS

FIELD OF THE INVENTION

The present invention relates to tire rollers for transporting thin slabs for use in thin slab continuous casting lines, and more particularly to a tire roller for transporting slabs which comprises tires adapted to come into direct contact with the slab and reduced in thermal stress to be produced therein.

BACKGROUND OF THE INVENTION

The thin slab continuous casting lines of iron mills have a heating furnace of the tunnel type disposed between casting equipment and rolling equipment. The heating furnace has inside thereof a large number of tire rollers arranged longitudinally thereof for transporting slabs as cast.

With reference to FIG. 1 showing a slab transport tire roller 1, the roller 1 comprises a tire 14 mounted on each of outer peripheral portions of a pipe 12 and is rotated by a rotating mechanism (not shown) connected to the roller. A cast slab 15 is transported as supported on the tires to the rolling equipment through a heating furnace 16 having a high temperature of at least about 1000° C. When heated to a high temperature, the pipe 12 diminishes in rigidity and is liable to deflect or deform. To prevent this, cooling water is passed through the interior of the pipe 12, and the pipe 12 is covered with a heat-insulating material 18 over the portions thereof between the tires 14. The tire has a solid integral structure, an outer periphery which comes into direct contact with the slab of high temperature and an inner periphery which is held at about 250° C. by the cooling effect of the pipe, so that a temperature difference of about 900° C. occurs between the tire outer and inner peripheries.

The tire thermally expands on coming into contact with the hot slab. Owing to the diametrical temperature difference, the amount of thermal expansion is great toward the outer periphery adjacent to the slab and smaller toward the inner periphery close to the pipe than at the outer periphery. Consequently, the thermal stress occurring in the tire acts as a compressive stress at the outer peripheral side and as a tensile stress at the inner peripheral side. Cracks 20 therefore develop in the inner peripheral side where the stress is great, entailing the likelihood that the tire 14 will fracture as shown in FIG. 8.

Accordingly, a tire roller has been proposed which is improved in structure to overcome the drawback (JP-A-175581/1987). With reference to FIG. 9 showing the roller, a heat-insulating space 22 is formed between a tire 14 to be heated by contact with the slab and a pipe 12 to be cooled with water to reduce the heat loss of the material supported by the tire. The tire 14 has an inside diameter greater than the outside diameter of the pipe 12 and is fixed to the pipe 12 by a pair of annular hubs 24, 24 on opposite sides of the tire. The tire, annular hubs and pipe define a space serving as the heat-insulating space 22.

To transmit the rotational torque of the pipe 12 to the tire 14, the annular hubs 24, 24 are joined to both the tire and the pipe by welding over the entire circumferences thereof. Since heat transfer is effected between the tire 14 and the hubs 24 and between the pipe 12 and the hubs 24 through the welds 26, it has been impossible to obtain a sufficient heat-insulating effect.

The tire is heated by the slab, while the annular hubs are cooled by the pipe, with the result that a temperature difference occurs between the tire and the annular hubs. Consequently, a difference occurs between the tire and the hubs in the amount of thermal expansion, producing a stress between the tire and the hubs and leading to the likelihood of cracks developing.

An object of the present invention is to overcome the foregoing problems and to provide a slab transport tire roller comprising tires which are diminished in the thermal stress to be produced therein.

SUMMARY OF THE INVENTION

The present invention provides a tire roller for transporting slabs which comprises tires each in the form of an assembly. The tire assembly is disposed at each of a plurality of outer peripheral portions of a pipe for passing cooling water therethrough and comprises a tire adapted to contact the slab, and a support member separated from the tire for connecting the tire to the pipe, the tire being engaged with the support member by rotation preventing means so as to be rotatable with the support member. It is desired that the support member, which is separated from the tire, be also separated from the pipe and engaged with the pipe by engaging means so as to be rotatable therewith, whereas the support member may be joined to the pipe by welding.

The support member may comprises a plurality of segments divided circumferentially thereof for connecting the tire to the pipe.

The pipe is covered with a heat-insulating material over the portions thereof between the tires.

According to the present invention, the tire is not directly fixed to the support member but is engaged therewith by the rotation preventing means, and is thereby allowed to thermally expand freely, so that even if the tire thermally expands, the resulting stress is almost unlikely to act on the support member. Furthermore, the heat transfer between the tire and the support member can be less than when the tire is fixed directly to the support member.

DETAILED DESCRIPTION OF THE INVENTION

The present invention will be described below with reference to the drawings.

Figure 1:
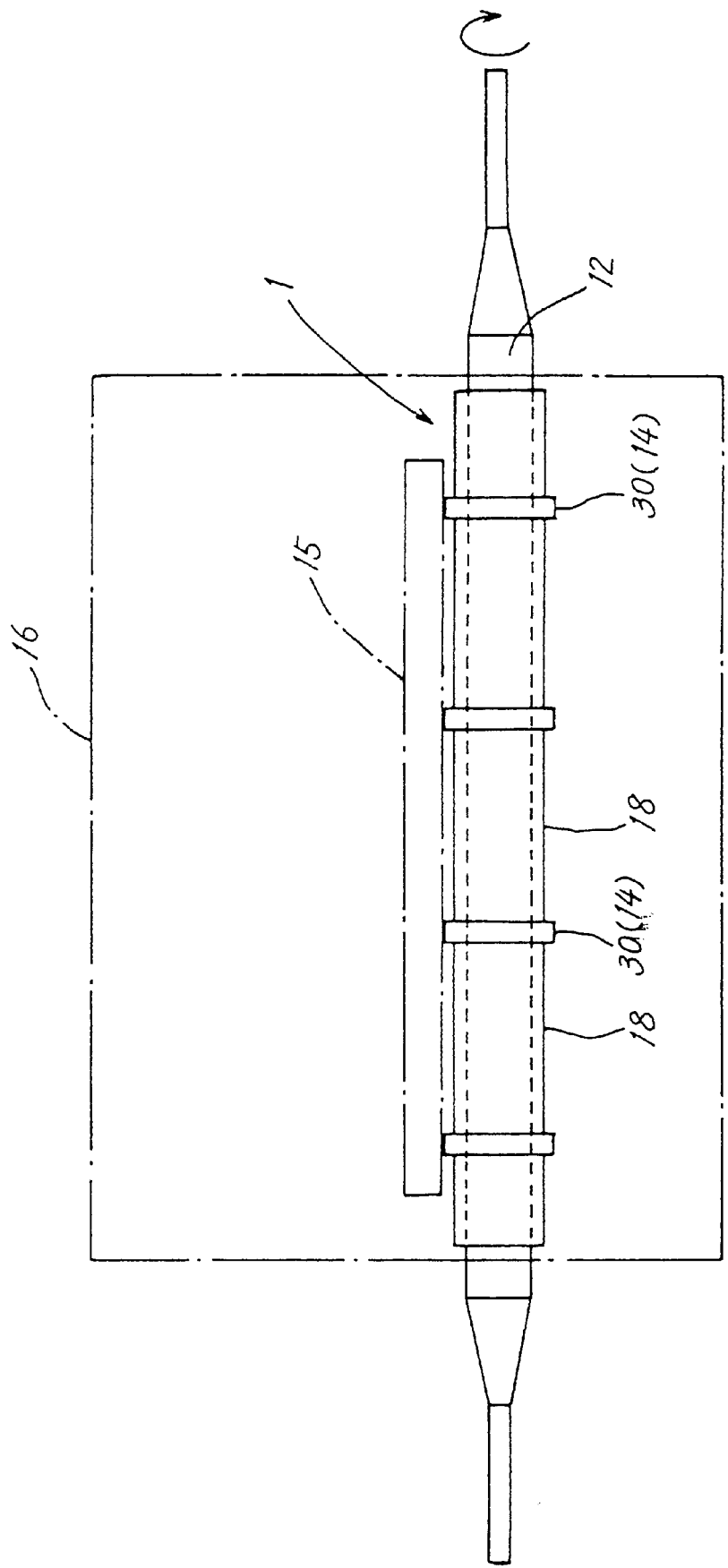
FIG. 1 is a front view showing a tire roller for transporting slabs.

With reference to FIG. 1, a tire roller 10 of the invention for transporting slabs comprises a pipe 12 and tire assemblies 30 each having a tire 14. The pipe 12 is covered with a heat-insulating material 18 over the portions thereof between the tires 14. The heat-insulating material has a slightly smaller outside diameter than the tires of the assemblies 30 and is thereby prevented from contacting the slab.

The pipe 12 is adapted to pass cooling water therethrough and has an end connected to a rotational drive unit (not shown). When driven, the drive unit rotates the slab transport tire roller 10.

Tire assemblies embodying the invention will be described below.

Embodiment 1

Figure 2:
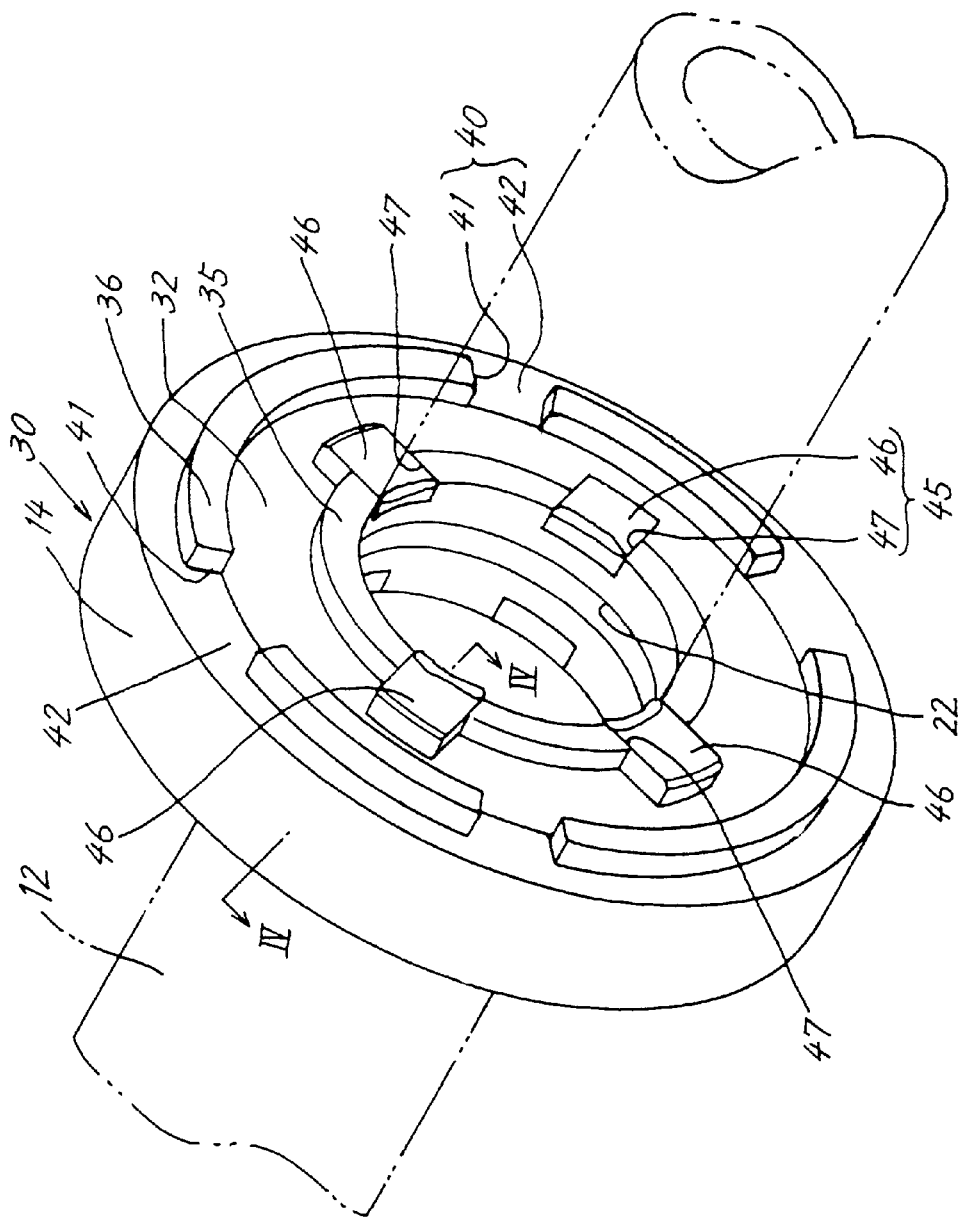
FIG. 2 is a perspective view showing a tire assembly of Embodiment 1.
Figure 3:
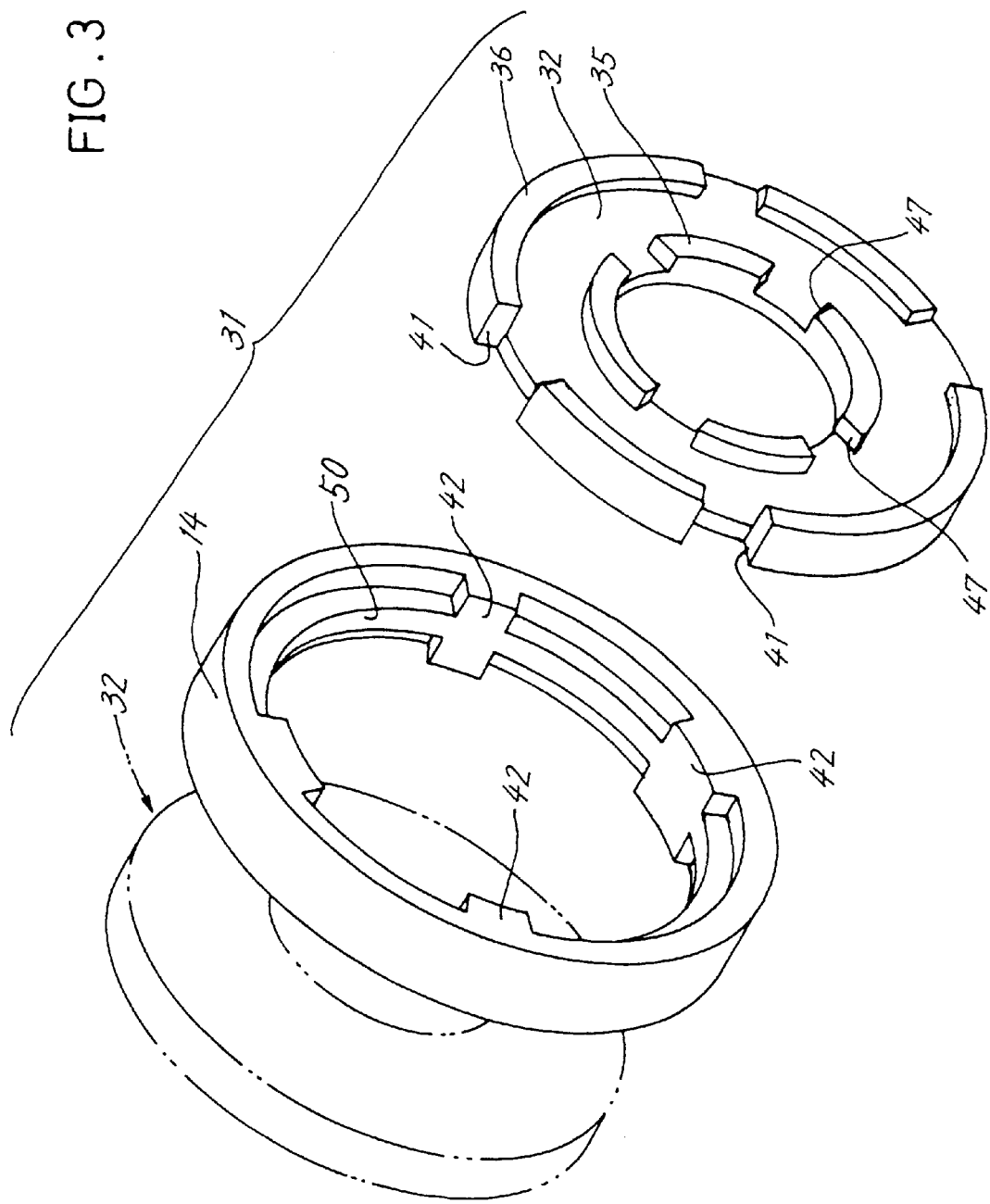
FIG. 3 is an exploded view showing a subassembly of Embodiment 1.
Figure 4:
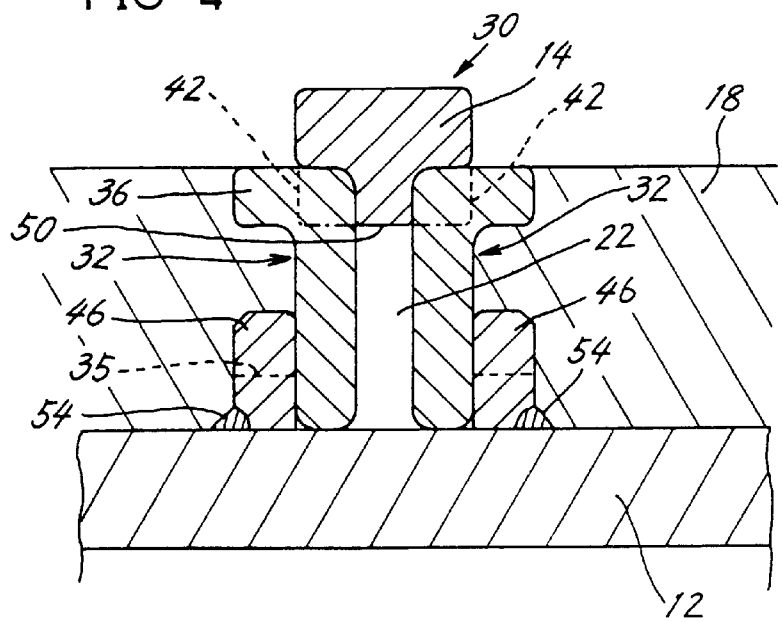
FIG. 4 is a view in section taken along the line IV—IV in FIG. 2.

FIGS. 2 to 4 show an embodiment of tire assembly 30. The tire assembly 30 comprises a pair of annular support members 32, 32 fitting around a pipe 12 and opposed to each other axially of the pipe, a tire 14 in engagement with the outer peripheries of the support members 32, and a plurality of engaging pieces 46 engaging each support member 32 with the pipe 12 to render the support member rotatable with the pipe.

The support member 32 is in the form of an annular disk, has an inside diameter slightly greater than the outside diameter of the pipe 12 and is formed with an inner peripheral wall 35 and an outer peripheral wall 36 extending along its inner and outer peripheries, respectively, and projecting outward. Engaging grooves 47 are formed in the inner peripheral wall 35, and cutouts 41 in the outer peripheral wall 36.

The engaging pieces 46 to be described below engage in the respective grooves 47 in the inner peripheral wall 35 of the support member 32 to provide engaging means 45, while projections 42 on the inner surface of the tire 14 to be described below engage in the respective cutouts 41 in the outer peripheral wall 36 to provide rotation preventing means 40.

As shown in FIG. 3, the tire 14 is in the form of a ring having an inside diameter slightly greater than the outside diameter of the support member 32. The tire 14 is formed on its inner periphery with the projections 42 fitting in the respective cutouts 41 in the wall 36 of each support member 32, and with a ridge 50 extending over the entire periphery centrally of the width of the tire inner surface. When the tire 14 is held between the support members 32, 32, the ridge 50 is in contact with the inside end faces of the outer peripheral walls 36, 36 of the support members 32, 32, preventing the tire 14 from slipping off and providing a predetermined spacing between the two support members 32, 32 to form a heat-insulating space 22 defined by the support members 32, 32, the tire 14 and the pipe 12 (see FIG. 4).

The engaging pieces 46 are equal in number to the number of the engaging grooves 47 formed in the inner peripheral wall 35 of the support member 32.

The tire assembly 30 can be mounted on the pipe 12 by the method to be described below.

A subassembly 31 is fabricated by holding the tire 14 between two support members 32, 32, with the projections 42 of the tire 14 fitting in the respective cutouts 41 in the outer peripheral walls 36 of the support members (see FIG. 3).

The subassembly 31 is fitted around the pipe 12 and positioned in place.

Engaging pieces 46 are fitted into the respective grooves 47 in the inner peripheral walls 35 of the support members 32 and welded to the pipe 12 as indicated at 54 (see FIG. 2).

A number of tire assemblies 30 are mounted as arranged at a predetermined spacing on the pipe 12 by repeating the above procedure the same number of times.

After the tire assemblies 30 are mounted on the pipe 12, the pipe 12 is covered with the heat-insulating material 18 over the portions thereof between the tire assemblies 30, whereby a tire roller 10 can be prepared for transporting slabs.

With the slab transport tire roller, the pipe is engaged with the opposed support members by engaging means, and the support members are engaged with each tire by rotation preventing means, whereby the pipe is made rotatable with the tire but is not fixed thereto directly. Accordingly, even if the tire thermally expands, the resulting thermal stress is not transmitted directly to the support members or to the pipe almost completely.

Furthermore, the amount of heat transfer between the tire and the support members and between the support members and the pipe is smaller than when the tire is fixed directly to the pipe, so that the temperature of the tire is almost unlikely to lower owing to heat transfer from the pipe. This produces no heat gradient in the tire to obviate cracking.

Although the subassembly is prepared first and then fitted around the pipe according to the foregoing embodiment, the tire and the support members may be fitted around the pipe so as to position the tire between the support members, followed by fitting of the engaging pieces in the respective engaging grooves and welding of the pieces to the pipe.

The tire is engaged with the support members by rotation preventing means and permitted to freely expand thermally so that the stress resulting the thermal expansion of the tire is prevented from acting on the support members as previously stated, whereas the support members may be welded directly to the pipe since the thermal stress acting between the support members and the pipe is relatively small.

Embodiment 2

Figure 5:
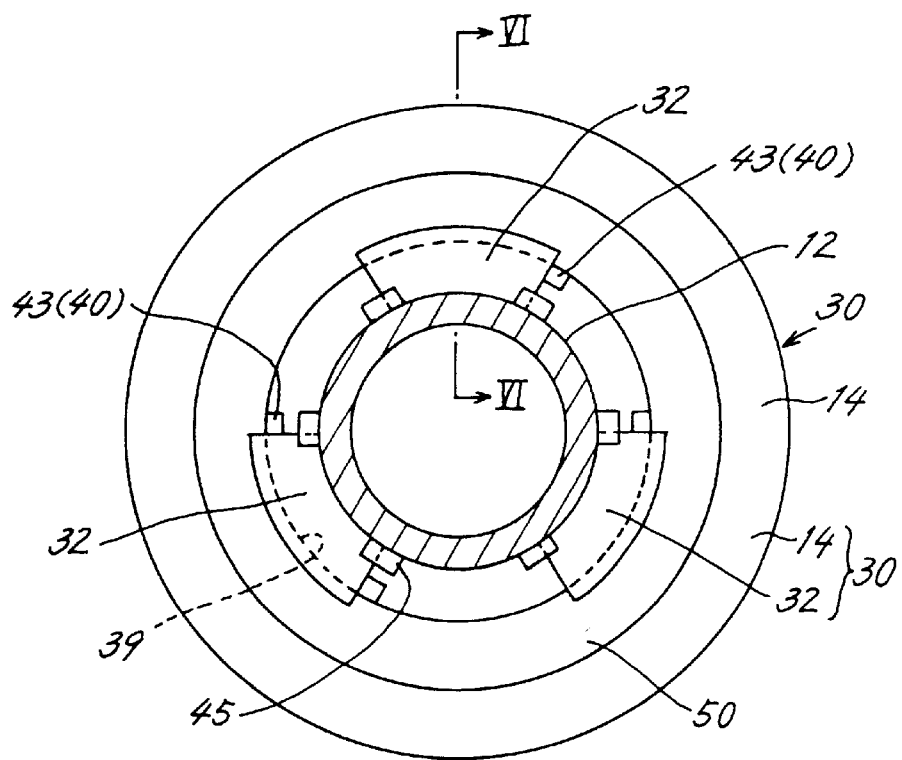
FIG. 5 is a side elevation showing a tire assembly of Embodiment 2.
Figure 6:
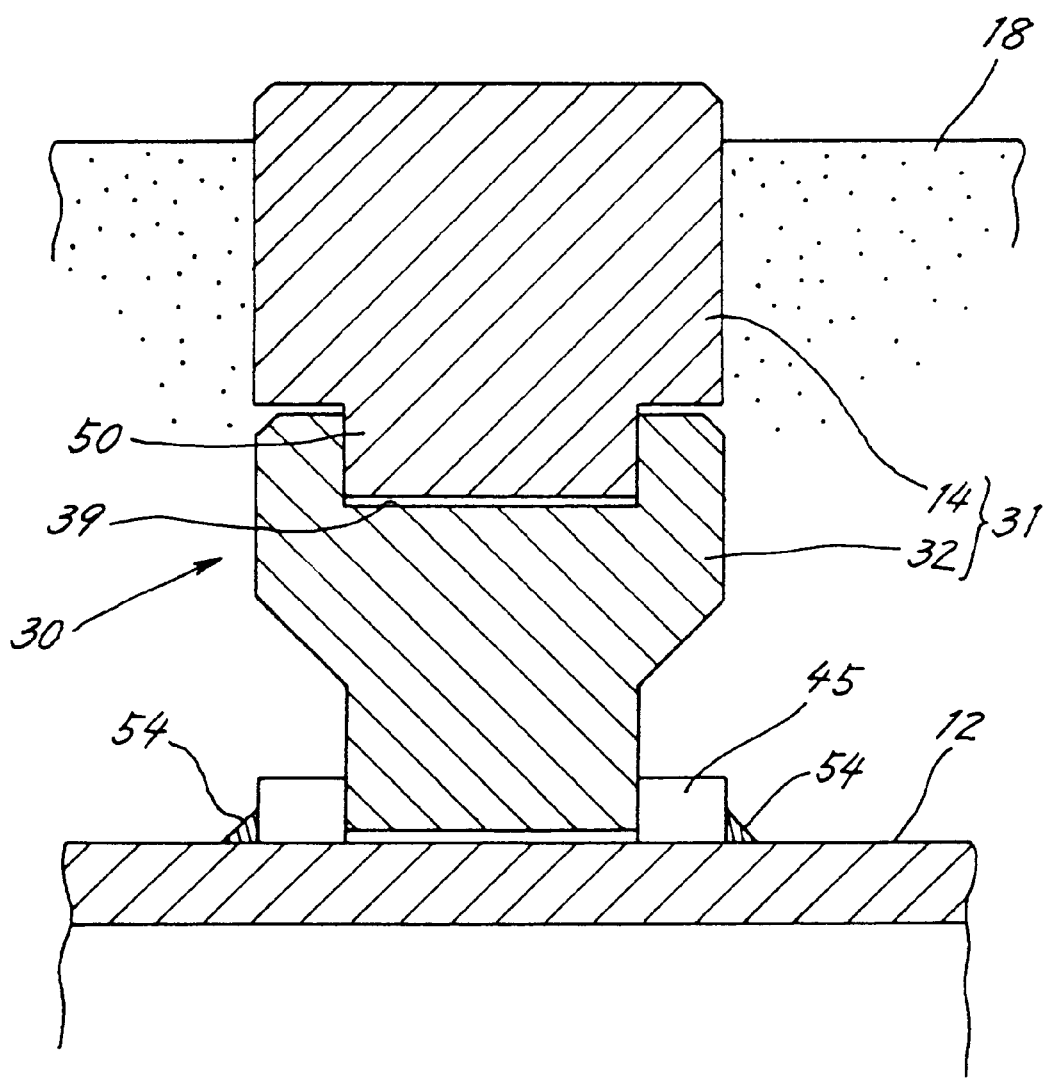
FIG. 6 is a view in section taken along the line VI—VI in FIG. 5.
Figure 7:
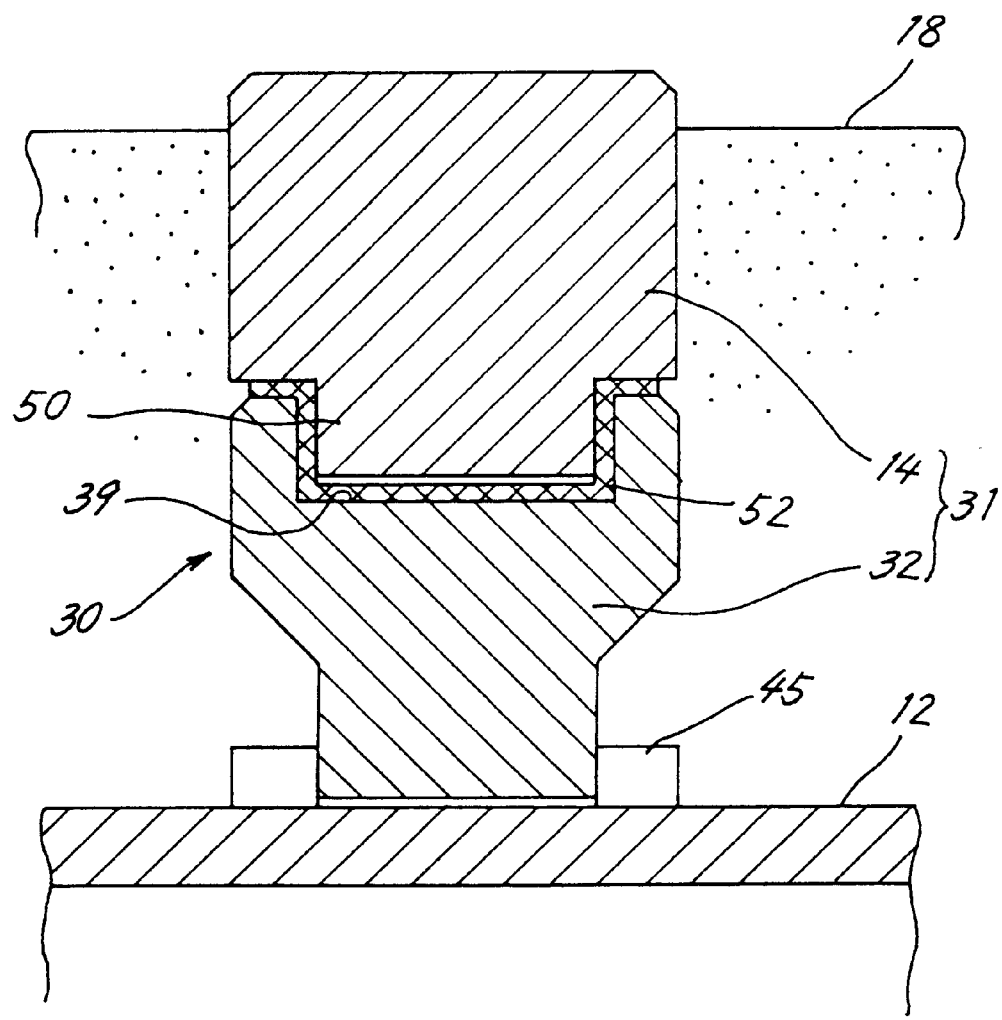
FIG. 7 is a sectional view showing a modification of Embodiment 2.
Figure 8:
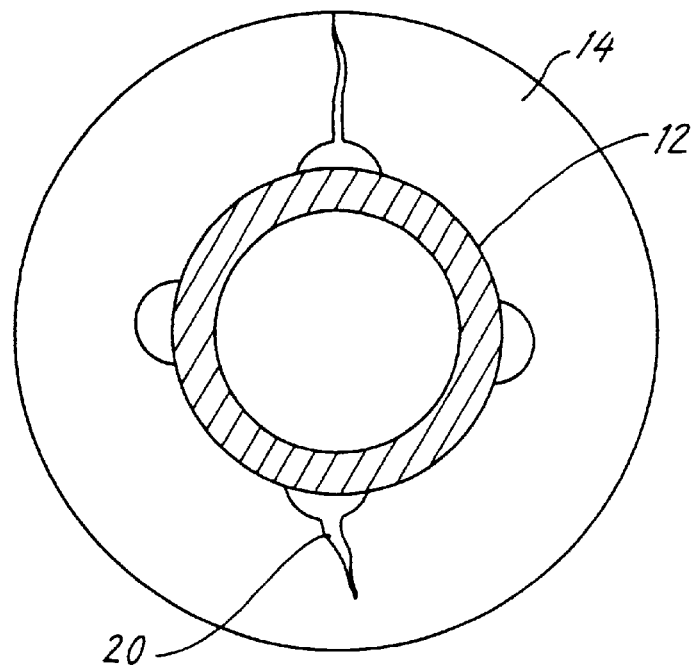
FIG. 8 is a side elevation of a conventional tire roller.
Figure 9:
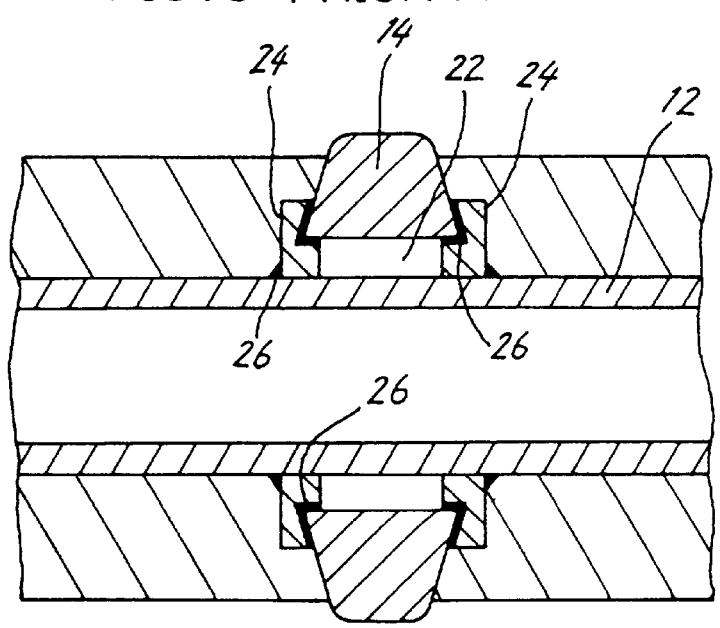
FIG. 9 is a sectional view showing another conventional tire roller.

FIGS. 5 to 7 show another embodiment of tire assembly 30. With this embodiment, a tire 14 is connected to a pipe 12 by divided support members arranged circumferentially of the tire.

With reference to FIG. 5, the tire assembly 30 comprises an annular tire 14 having an outer peripheral surface for contact with a slab, a plurality of support members 32 positioned between the tire 14 and the pipe 12 and arranged at a predetermined spacing circumferentially of the tire, rotation preventing means 40 for engaging the tire 14 with the support members 32 and rendering the tire rotatable with the support members, and engaging means 45 for engaging the support members 32 with the pipe 12.

The arrangement of the support members 32 has an inside diameter slightly greater than the outside diameter of the pipe and an outside diameter slightly smaller than the inside diameter of the tire. The support members 32 are each generally in the form of a sector. As shown in FIG. 6, a circumferential groove 39 is formed in the outer peripheral surface of each support member 32. The support members 32 are engaged with the pipe 12 by the engaging means 45, which comprises members each formed with a rectangular engaging groove. The groove has such a width that a side portion of the support member is fittable in the groove. The engaging means 45 is welded as at 54 to the outer periphery of the pipe 12 and holds each support member 32 at opposite positions along the circumferential direction of the pipe 12 so as to support the support members 32 as arranged at the predetermined spacing circumferentially of the pipe 12.

The tire 14 is in the form of a ring, has a ridge 50 on its inner periphery and is mounted on the support members 32 with the ridge 50 fitted in the grooves 39 of the members 32.

The rotation preventing means 40 for engaging the tire 14 with the support members 32 comprises lugs 43 welded to the ridge 50 of the tire 14 for causing the tire 14 to rotate with the support members 32. The lug 43 is provided at each of circumferentially opposite sides of each support member 32 for retaining the tire 14 against rotation, but may be engaged with the support member only at the front side thereof with respect to the direction of rotation of the support member since at least the slab transport tire roller needs to be rotated.

The tire assembly 30 of the foregoing construction can be mounted on the pipe by the following method.

First, the tire 14 is engaged with the support members 32 to prepare a subassembly 31. The subassembly 31 is then fitted around the pipe 12, and the engaging means 45 and the rotation preventing means 40 are welded to the pipe and the tire, respectively, whereby a tire assembly 30 is mounted on the pipe 14. Incidentally, the rotation preventing means 40 may be welded to the tire 14 in advance.

With the slab transport tire roller described, the tire is not fixed directly to the support members therefor, so that the tire is free to thermally expand. The thermal stress of the tire is therefore almost unlikely to act on the support members or the pipe. Further because the tire is not fixed directly to the support members, which are not fixed directly to the pipe, the amount of heat transfer involved diminishes, eliminating the likelihood that the tire will be cooled by heat transfer from the pipe.

The amount of heat transfer between the tire and the support members can be further reduced when the height of the ridge on the inner periphery of the tire is made smaller than the depth of the groove in the outer periphery of each support member to form a heat-insulating space 39 between the extremity of the ridge and the bottom face of the grooved portion.

As shown in FIG. 7, a heat-insulating layer 52 of heat-insulating material can be provided between the tire 14 and the support member 32 to further reduce the amount of heat transfer between the tire 14 and the support member 32. The heat-insulating layer 52 may be formed by interposing a heat-insulating material, such as $Al_2O_3$, $SiO_2$ or $ZrO_2$, between the tire and the support member, or by thermally spraying a ceramic heat-insulating material, such as alumina, onto the inner periphery of the tire or outer periphery of the support member.

PREFERRED EXAMPLES OF TIRE MATERIALS

The tires of the tire roller of the present invention can be prepared from a heat-resistant alloy containing, in wt. %, 0.1 to 0.5% of C, up to 2% of Si, up to 2% of Mn, 26 to 35% of Ni, 0.01 to 2% of Al and 0.01 to 1% of Ti, further containing, in wt. %, at least one of 3 to 7% of Co, 1 to 5% of Nb and 2 to 14% of W, and the balance substantially Fe.

This heat-resistant alloy is excellent in abrasion resistance and oxidation resistance at high temperatures. The actual operation involves a so-called "build-up" phenomenon, i.e., the phenomenon that surface oxides (scale) and metal particles of the steel material, such as slabs, transported deposit on the surface of the tire. Such deposits on the tire are undesirable since they give rise to chemical reactions, rendering the tire rough-surfaced or causing damage thereto. However, the heat-resistant alloy stated above has the advantage of being excellent also in build-up resistance.

The components of the alloy are limited as above for the following reasons.

C: 0.1 to 0.5%

C forms a solid solution with austenite phase, gives an enhanced strength to the alloy structure and produces carbides with Cr, W and Nb, affording improved abrasion resistance at high temperatures. An excess of C, on the other hand, results in lower toughness. Accordingly, the C content should be limited to 0.1 to 0.5%.

Si: up to 2%

Si acts as a deoxidizer and is effective for giving improved weldability and higher heat resistance. However, presence of more than 2% of Si leads to lower toughness and impaired castability. The Si content should therefore be limited to not higher than 2%.

Mn: up to 2%

Mn is effective for deoxidation and strengthening. However, if the Mn content exceeds 2%, lower weldability will result, so that the Mn content should be up to 2%.

Ni: 34–50%

Ni is effective for giving a stabilized austenite structure and a stabilized oxide film of improved compactness. At least 34% of Ni should be present to ensure these effects, whereas contents exceeding 50% fail to achieve a correspondingly improved result. The upper limit should be 50% therefore.

Cr: 26–35%

Although Cr is effective for giving improved abrasion resistance and higher oxidation resistance at high temperatures, this effect is not fully available if the content is less than 26%, whereas presence of more than 35% of this element entails lower build-up resistance. The Cr content should be limited to 26 to 35% in order to ensure abrasion resistance, oxidation resistance and build-up resistance in good balance.

Al: 0.01 to 2%

Al is effective for giving higher oxidation resistance and improved build-up resistance and should be present in an amount of at least 0.01%. On the other hand, Al acts to lower the castability and weldability, and presence of more than 2% of Al markedly impairs the castability and weldability. Accordingly, the upper limit should be 2%.

Ti: 0.01 to 1%

Like Al, Ti is also effective for giving higher oxidation resistance and improved build-up resistance, and should be present in an amount of at least 0.01%. However, contents exceeding 1% result in seriously impaired castability and weldability. Accordingly, the upper limit should be 1%.

Co: 3 to 7%

Co, like Ni, gives a stabilized austenite structure, contributing to the improvement of toughness and high-temperature strength, and should therefore be present in an amount of at least 3%. On the other hand, presence of more than 7% of Co is likely to entail sigma embrittlement. Since Co is a very expensive element, an excessive Co content is economically unfavorable. For this reason, the upper limit should be 7%. As the Ni content increases close to 50%, the above effects of Co diminish, so that Co can be dispensed with in this case.

W: 2 to 14%

W is an element effective to give enhanced abrasion resistance at high temperatures and to afford improved build-up resistance. It is desirable that at least 2% of W be present to ensure these effects. However, more than 14% of W, even if present, fails to attain a correspondingly improved result, and impaired workability then results. The upper limit should therefore be 14%.

Nb: 1 to 5%

Like W, Nb is an element effective to give increased abrasion resistance at high temperatures and to afford improved build-up resistance. To ensure these effects, at least 1% of Nb should be present. Presence of more than 5% of Nb nevertheless leads to lower weldability and impaired oxidation resistance, so that the Nb content should be 1 to 5%.

The heat-resistant alloy comprises these component elements and the balance substantially Fe. Presence of P, S and like impurities are allowable which become inevitably incorporated into the alloy when usual alloy preparing techniques are used.

Specimens of such heat-resistant alloys of varying compositions were prepared and then checked for build-up resistance, high-temperature abrasion resistance and high-temperature oxidation resistance.

Table 1 shows the chemical compositions of the alloy specimens used. In Table 1, No. 1 to No. 4 are the alloy compositions of preferred examples, and No. 5 to No. 8 are the alloy compositions of conventional alloys.

TABLE 1

Alloy Composition (wt. %)
(Balance substantially Fe)

| No. | C | Si | Mn | Ni | Cr | Al | Ti | W | Nb | Co | Mo |
|---|---|---|---|---|---|---|---|---|---|---|---|
| 1 | 0.45 | 0.22 | 0.46 | 47.5 | 30.0 | 0.23 | 0.01 | 12.8 | — | — | — |
| 2 | 0.45 | 1.81 | 0.97 | 43.1 | 31.6 | 0.08 | 0.04 | — | 1.3 | — | — |
| 3 | 0.35 | 1.80 | 1.39 | 34.8 | 29.8 | 0.02 | 0.01 | — | — | 4.1 | — |
| 4 | 0.38 | 1.77 | 1.43 | 34.7 | 31.1 | 0.02 | 0.01 | 4.8 | 2.9 | 3.9 | — |
| 5 | 0.26 | 0.73 | 0.60 | 0.1 | 27.3 | — | — | — | 2.1 | 50.8 | — |
| 6 | 0.46 | 1.04 | 0.56 | 46.0 | 26.6 | — | — | 4.9 | — | 2.8 | 0.2 |
| 7 | 0.42 | 1.20 | 1.21 | 19.6 | 24.6 | — | — | — | — | — | — |
| 8 | 0.04 | 0.75 | 0.68 | 0.1 | 27.6 | — | — | — | — | 49.8 | — |

TABLE 2

| No. | Deposition of scale of counterpart member |
|---|---|
| 1 | Almost no deposit |
| 2 | Slight deposit |
| 3 | Slight deposit |
| 4 | Almost no deposit |
| 5 | Large amount of deposit |
| 6 | Considerable amount of deposit |
| 7 | Considerable amount of deposit |
| 8 | Large amount of deposit |

Build-up Resistance Test

Figure 10:
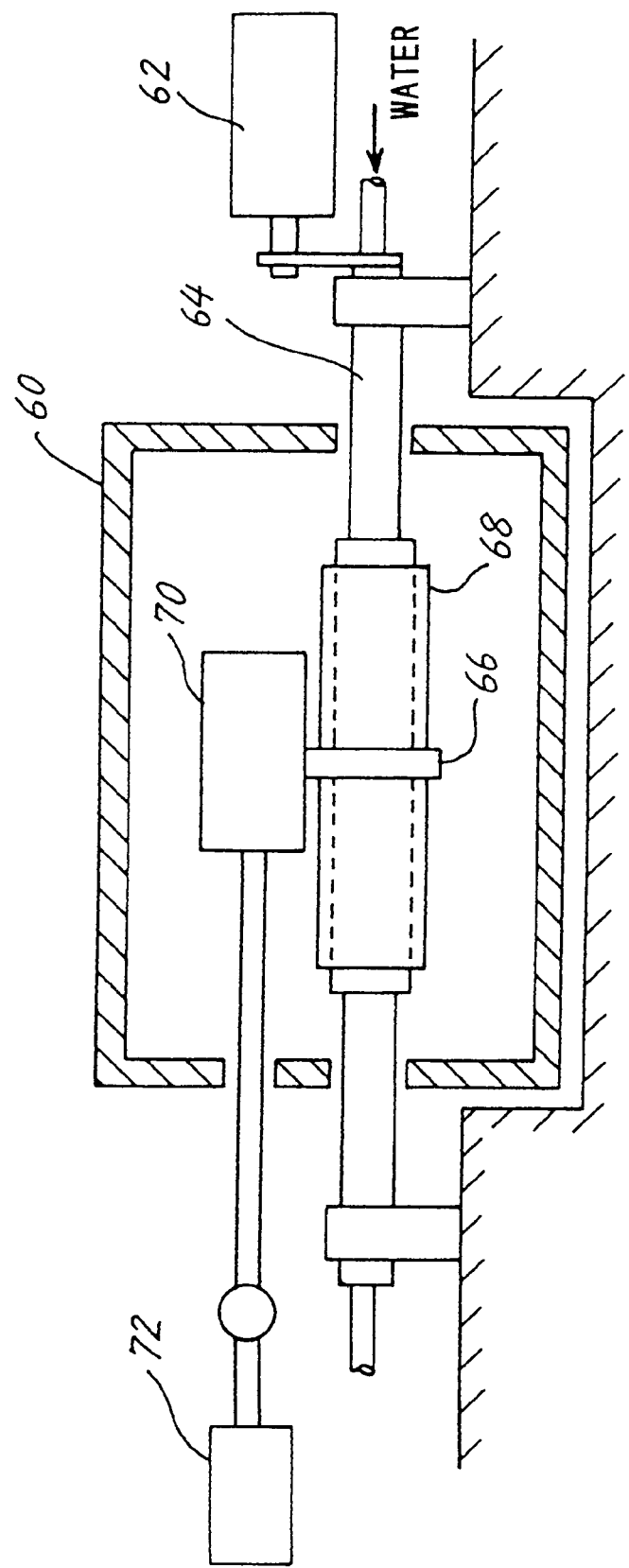
FIG. 10 is a diagram generally showing a test apparatus for determining high-temperature abrasion resistance and build-up resistance.

FIG. 10 generally shows an apparatus used for conducting a build-up resistance test.

With reference to FIG. 10, a test heating furnace 60 has rotatably disposed therein a hollow cylindrical shaft 64 coupled to a drive motor 62, with cooling water passing through the shaft 64. A specimen ring 66 is fitted around the shaft 64 which is covered with a protective layer 68 of an $Al_2O_3$ refractory over the outer periphery thereof.

To subject the specimen ring 66 to a load, a hollow cylindrical counterpart member 70 is so disposed as to rotate with the specimen ring 66. The counterpart member 70 is connected to a pneumatic pump 72, and is movable widthwise of the ring 66 so as to avoid local abrasion.

The specimen ring 66 used was 60 mm in outside diameter, 40 mm in inside diameter and 15 mm in width.

The counterpart member 70 needs to be positively oxidized for checking the specimen for build-up and was therefore prepared from S15C material which is susceptible to oxidation in the open atmosphere. The counterpart member 70 was so sized that the pressure to be thereby applied to the surface of the specimen ring 66 would correspond to the actual condition for use (1.3 kg/mm$^2$). Thus, the counterpart member 70 was 70 mm in outside diameter and 100 mm in length (3 kg).

The specimen ring was tested at a temperature of 1150° C. within the heating furnace of the atmospheric condition and a shaft rotational speed of 10 r.p.m. for 96 hours. The counterpart member was replaced by another every 24 hours.

The specimen ring was checked for the deposition of the scale of the counterpart member for the evaluation of the build-up resistance.

The result of evaluation is given in Table 2, which indicates that the Example No. 1 to Example No. 4 of the invention were almost free from deposition of scale of the counterpart member or had only a very small amount of deposit. This reveals that the invention assures satisfactory build-up resistance unlike the conventional examples.

Abrasion Resistance Test

An abrasion resistance test was conducted using the same apparatus as the build-up resistance test in the same manner as this test except that a different counterpart member 70 was used. The counterpart member for the abrasion resistance test, unlike the one used for the build-up resistance test, needs to be prevented from oxidation in the atmosphere, and was therefore prepared by applying a powder mainly containing Co and Cr to the surface of a member by build-up spraying.

The specimen ring was checked for outside diameter 24 hours, 48 hours, 72 hours and 96 hours after the start of the test. Table 3 shows the resulting reductions from the original outside diameter which was 60 mm before the test.

TABLE 3

Reduction in Outside Diameter (mm)

| No. | After 24 hours | After 48 hours | After 72 hours | After 96 hours |
|---|---|---|---|---|
| 1 | 0 | 0 | −0.01 | −0.01 |
| 2 | 0 | −0.01 | −0.02 | −0.02 |
| 3 | −0.01 | −0.02 | −0.02 | −0.03 |
| 4 | −0.01 | −0.01 | −0.01 | −0.02 |
| 5 | −0.04 | −0.07 | −0.08 | −0.16 |
| 6 | −0.02 | −0.03 | −0.04 | −0.05 |
| 7 | −0.01 | −0.03 | −0.03 | −0.08 |
| 8 | −0.02 | −0.05 | −0.08 | −0.09 |

Table 3 shows that Example No. 1 to Example No. 4 of the invention are very slight in the reduction of the outside diameter after the lapse of 96 hours unlike the conventional examples No. 5 to No. 8, hence satisfactory abrasion resistance at a high temperature.

Oxidation Resistance Test

A solid cylindrical test piece (8 mm in diameter and 50 mm in length) was prepared, then held at 1000° C. within a heating furnace for 100 hours, and thereafter withdrawn from the furnace. The resulting scale was removed from the surface of the test piece with an acid solution to measure the variation resulting from the test in the weight of the test piece and determine the oxidation loss (mm/year). Table 4 shows the rest result.

TABLE 4

| No. | Oxidation loss (mm/year) |
| --- | --- |
| 1 | 0.27 |
| 2 | 0.32 |
| 3 | 0.31 |
| 4 | 0.34 |
| 5 | 3.80 |
| 6 | 0.37 |
| 7 | 0.36 |
| 8 | 0.29 |

Table 4 reveals that Example No. 1 to Example No. 4 of the invention are smaller in oxidation loss than the conventional example No. 5 and satisfactory in oxidation resistance. Although the examples No. 6 to No. 8 are comparable to the examples of the invention in oxidation resistance, these conventional examples are inferior to those of the invention in build-up resistance and abrasion resistance as previously stated.

With the slab transport tire roller of the invention, the amount of heat transfer between the tire and the pipe can be greatly reduced, so that it is almost unlikely that the temperature of the tire will be lowered by the transfer of heat from the pipe.

The tire is not fixed to the support members but is merely engaged therewith, and is therefore free to expand thermally. Accordingly, the thermal stress of the tire is almost unlikely to act on the support members.

Desirable tire rollers which are outstanding in abrasion resistance, oxidation resistance and build-up resistance can be fabricated by preparing tires from the heat-resistant alloy of the above composition.

Apparently the present invention can be modified or altered by one skilled in the art without departing from the spirit of the invention. Such modifications or alterations are included within the scope of the invention as set forth in the appended claims.

What is claimed is:

1. A slab transport tire roller comprising a tire assembly mounted on each of a plurality of portions of outer periphery of a pipe and having a tire for transporting a slab as supported thereon, the tire assembly comprising:

a support member disposed on the outer periphery of the pipe and engageable with the tire, the tire being provided around an outer periphery of the support member and engageable with the support member, and rotation preventing means for engaging the tire with the support member, the tire being engaged with the support member by the rotation preventing means and thereby made rotatable with the support member, the tire being made of a heat-resistant alloy consisting essentially of, in wt. %, 0.1 to 0.5% of C, up to 2% of Si, up to 2% of Mn, 26 to 35% of Ni, 0.01 to 2% of Al and 1% of Ti, further containing, in wt. % 2 to 14% of W and/or 1 to 5% of Nb, and the balance substantially Fe.

2. The slab transport tire roller as defined in claim 1 wherein the support member is engaged with the outer periphery of the pipe by engaging means and thereby made rotatable with the pipe.

3. The slab transport tire roller as defined in claim 1 wherein the support member comprises a pair of annular members arranged on the outer periphery of the pipe and opposed to and spaced apart from each other axially of the pipe, and the tire is fitted around outer peripheries of the annular members.

4. The slab transport tire roller as defined in claim 1 wherein the support member comprises approximately sectorial members arranged at a predetermined spacing circumferentially of the pipe, and the arrangement of the sectorial members has an inside diameter slightly greater than the outside diameter of the pipe and an outside diameter slightly smaller than the inside diameter of the tire.

5. The slab transport tire roller as defined in claim 1 wherein a heat-insulating layer of heat-insulating material is provided between the support member and the tire.

6. A slab transport tire roller comprising a tire assembly mounted on each of a plurality of portions of outer periphery of a pipe and having a tire for transporting a slab as supported thereon, the tire assembly comprising:

a support member disposed on the outer periphery of the pipe and engageable with the tire, the tire being provided around an outer periphery of the support member and engageable with the support member and, rotation preventing means for engaging the tire with the support member, the tire being engaged with the support member by the rotation preventing means and thereby made rotatable with the support member, the tire being made of a heat-resistant alloy consisting essentially of, in wt. %. 0.1 to 0.5% of C, up to 2% of Si, up to 2% of Mn, 26 to 35% of Ni, 0.01 to 2% of Al, 0.01 to 1% of Ti and 3 to 7% of Co, and the balance substantially Fe.

7. The slab transport tire roller as defined in claim 6 wherein the support member is engaged with the outer periphery of the pipe by engaging means and thereby made rotatable with the pipe.

8. The slab transport tire roller as defined in claim 6 wherein the support member comprises a pair of annular members arranged on the outer periphery of the pipe and opposed to and spaced apart from each other axially of the pipe, and the tire is fitted around the outer peripheries of the annular members.

9. The slab transport tire roller as defined in claim 6 wherein the support member comprises approximately sectorial members arranged at a predetermined spacing circumferentially of the pipe, and the arrangement of the sectorial members has an inside diameter slightly greater than the outside diameter of the pipe and an outside diameter slightly smaller than the inside diameter of the tire.

10. The slab transport tire roller as defined in claim 6 wherein a heat-insulating layer of heat-insulating material is provided between the support member and the tire.

11. A slab transport tire roller comprising a tire assembly mounted on each of a plurality of portions of outer periphery of a pipe and having a tire for transporting a slab as supported thereon, the tire assembly comprising:

a support member disposed on the outer periphery of the pipe and engageable with the tire, the tire being provided around an outer periphery of the support member and engageable with the support member, and rotation preventing means for engaging the tire with the support member, the tire being engaged with the support member by the rotation preventing means and thereby made rotatable with the support member, the tire being made of a heat-resistant alloy consisting essentially of, in wt. %, 0.1 to 0.5% of C, up to 2% of Si, up to 2% of Mn, 26 to 35% of Ni, 0.01 to 2% of Al, 0.01 to 1% of Ti and 3 to 7% of Co, further containing, in wt. %, 2 to 14% of W and/or 1 to 5% of Nb, and the balance substantially Fe.

12. The slab transport tire roller as defined in claim 11 wherein the support member is engaged with the outer periphery of the pipe by engaging means and thereby made rotatable with the pipe.

13. The slab transport tire roller as defined in claim 11 wherein the support member comprises a pair of annular members arranged on the outer periphery of the pipe and opposed to and spaced apart from each other axially of the pipe, and the tire is fitted around outer peripheries of the annular members.

14. The slab transport tire roller as defined in claim 11 wherein the support member comprises approximately sectorial members arranged at a predetermined spacing circumferentially of the pipe, and the arrangement of the sectorial members has an inside diameter slightly greater than the outside diameter of the pipe and on outside diameter slightly smaller than the inside diameter of the tire.

15. The slab transport tire roller as defined in claim 11 wherein a heat-insulating layer of heat-insulating material is provided between the support member and the tire.

* * * * *